US005902032A

United States Patent [19]

Hannigan et al.

[11] Patent Number: 5,902,032

[45] Date of Patent: May 11, 1999

[54] LUMINAIRE APPARATUS AND METHOD FOR GENERATING LUMIAS WITH A LOW WATTAGE EXTENDED LIGHT SOURCE

[75] Inventors: Carl Hannigan, Cerritos; James Hannigan, Long Beach, both of Calif.

[73] Assignee: Precision Projection Systems, Inc., Cerritos, Calif.

[21] Appl. No.: 08/732,127

[22] Filed: Oct. 18, 1996

[51] Int. Cl.[6] ...................................................... G03B 21/14

[52] U.S. Cl. ................................ 353/38; 353/84; 353/62; 362/309

[58] Field of Search ................................ 353/38, 62, 84, 353/122, 102; 362/292, 293, 309, 336, 338, 311, 351, 811

[56] References Cited

U.S. PATENT DOCUMENTS

| | | | |
|---|---|---|---|
| 2,721,256 | 10/1955 | Duhon | 240/10.1 |
| 2,959,094 | 11/1960 | Kosma | 88/24 |
| 3,597,069 | 8/1971 | Heinonen, Jr. | 353/84 |
| 3,679,888 | 7/1972 | Reiback | 240/10.1 |
| 3,807,072 | 4/1974 | Luxon | 40/106.52 |
| 3,868,501 | 2/1975 | Barbour | 240/10.1 |
| 4,217,040 | 8/1980 | Longerman | 353/46 |
| 4,742,439 | 5/1988 | Choate | 362/311 |
| 4,800,474 | 1/1989 | Bornhorst | 362/319 |
| 5,755,501 | 5/1998 | Shinohara et al. | 353/84 |

OTHER PUBLICATIONS

Selected pp. AH–1 and AH–2 from the Precision Projection System catalog showing the Remote Lumia Module., 1996.

Selected pages from the Olesen catalog, showing currently–available lumia apparatus, pp. AH–1 through AH–5.

*Primary Examiner*—William Dowling
*Attorney, Agent, or Firm*—Philip H. Haymond

[57] ABSTRACT

A method and apparatus for generating lumia patterns, using a low wattage incandescent light source having a source size of greater than one millimeter. The light source, a multiple-lensing filter and an imaging lens are tuned with each other to create a bright, reinforcing pattern from a relatively weak light source.

12 Claims, 5 Drawing Sheets

LUMINAIRE APPARATUS AND METHOD FOR GENERATING LUMIAS WITH A LOW WATTAGE EXTENDED LIGHT SOURCE

BACKGROUND OF THE INVENTION

1. Field of Invention

This invention relates to the field of Lighting Effects and more particularly concerns generating Lighting Effects patterns with a low wattage light source to achieve lighting effects heretofore only practical for use in the theater with the use of cumbersome and hazardous equipment. Specifically this method and apparatus employs a low wattage extended light source having a combination of elements adjusted to explicit parameters to achieve lighting effects in an highly efficient, safe, economical and energy saving manner.

2. Background of the Invention

Lighting Effects is the general area of reproducing a pattern or image of light for theatrical purposes. Lighting Effects are typically those effects employed to simulate the shadows of real objects such as foliage or window blinds, as well to simulate the random light patterns produced by fire, smoke, rippling water or the like for theatrical purposes. Such random patterns generated in Lighting Effects are referred to herein as lumias.

A luminaire is a general term for a unit of lighting equipment including spotlights, flood lights and any other lighting equipment. Luminaire is the international generic term for lighting equipment, it is not restricted to theatrical lighting.

Until now many complicated, expensive and cumbersome arrangements of luminaire had to be employed to generate lumias. For instance, an animation disc, a slotted or perforated metal disc which rotates in front of a lamp, known as a gobo, could provide the effect of movement in a lumia. A gobo is a thin, flat metal disk or plate having a cutout design, or a glass plate etched or painted to produce a design. A gobo is placed in front of a powerful theatrical spotlight, to project lighting effects such as those giving the impression of foliage or windows or the like.

A gobo typically requires the use of a large and high wattage type of theatrical spotlight known as an ellipsoidal reflector spotlight projector. An ellipsoidal reflector spotlight projector is a large theater luminaire that generates an enormous amount of heat and must have a skilled technician to operate it.

By use of different colored material, a gobo can produce a colored image. Movement can be added to the gobo-generated image by rotating the gobo disks or wheels. For instance a painted glass disk rotating in front of the light source of an ellipsoidal reflector spotlight projector with an imaging lens to focus the image can produce patterns of flames, rain or snow. Likewise, the image of the flickering of a flame can be produced by using an irregularly slotted rotating metal disk through which light is shone onto a prism-type piece of glass which scatters the beam of light and adds the “dancing” effect of firelight to a scene.

A gobo is greatly limited in its application however because an ellipsoidal reflector spotlight projector is large and uses a very hot light source to project a satisfactory image. A gobo arrangement is therefore wholly impractical for use in residential or common retail business lighting applications, such as aquariums or restaurants. The heat generated, the energy consumption, the size, as well expense of the equipment and the skill required in operating it make it far too impractical for the lay person to use as a common appliance.

Standard Methods of Projection

There are several methods and apparatus used in the art for generating projected images, including lumias.

With gobo designs of the past, the ellipsoidal reflector spotlight projector was used to illuminate a metal gobo cutout and the resulting image was projected with an imaging lens. The resolution and quality of the resulting image was marginal and only a gobo cutout made of metal could be used because of the great heat generated by the lamp. The metal gobo cutout would still soon become warped or otherwise damaged by the heat from the lamp.

A more recent gobo technique reduces the heat from the light source by means of a heat-conducting reflector behind the light source and a heat-removing filter interposed between the lamp and the gobo disk. This heat reduction made it possible to also use gobos made of etched or painted glass without burning, cracking or otherwise thermally damaging the glass gobo.

By far the most common method of image projection is that used for movie or slide film. This method uses a light source to project light onto a converging lens, which in turn concentrates the light onto the film. The image from the film is then magnified by an imaging lens to project it on a surface such as a screen.

One critical function of the converging lens as used for gobos or film is to produce a uniform illumination at the plane in which a film is positioned, otherwise the resulting image will vary in intensity. A properly positioned converging lens will also prevent an image of the light source itself from being focused on the film plane and thereafter by the imaging lens.

Film projectors usually use either an arc or incandescent light source. The incandescent source is usually of the type having a bulb with a filament burning in it, so proper converging lens design is essential to prevent an image of the filament and bulb from becoming superimposed on the projected film image. The same problem can occur with any light source so great care is taken to avoid this and project only a uniform light upon a film or gobo.

With both film and gobo cutouts it is also crucial that the imaged material be flat and thin. If the material is not flat, in a single plane, the imaging lens cannot uniformly focus on all parts of the material to be imaged. If the material is not thin it could produce pronounced diffraction effects. While all materials refract light to some extent, the flatness of the materials used, above, is calculated to avoid refracting or deflecting the light source as much as possible.

The resulting projected images are aesthetically pleasing, but appear flat and without the appearance of depth or dimension desirable in some lumias. This is because the imaged material of film or gobo cutouts acts to block or filter the light and the resulting projected image is essentially a shadow and/or colored image.

Dimensional images, giving an impression of depth, can be generated by passing light though a variable-refracting filter. The term variable-refracting filter as used here refers to any material acting as a plurality of lenses, such as rippled or patterned plastic or glass. The ripples or patterns act as small lenses, refracting the light in patterns corresponding to the variable refractive power of the of the material. When light is transmitted through these materials they can produce an image having an aesthetic appearance of dimension or depth.

While a lumia can be produced using a gobo made of variable-refracting filter material, this requires the use of a lamp with the power of an ellipsoidal reflector spotlight or the image will be too dim to be of practical use.

Other methods have been used to achieve dimensional images, but only with the use of a point light source. A point light source is a light source size less than 1 millimeter. An extended light source has a cross section of 1 millimeter or more. In the past a point light source has been effectively used to generate lumias by using an optical fiber illuminated by a laser or by a xenon arc lamp, without the use of an imaging lens. This type of optic fiber arrangement has been used to pass light through a variable-refracting filter having a very fine pattern. This apparatus works well but requires the use of an expensive laser or xenon lamp and, being a point light source, can only produce a sharply defined image of the pattern of the variable-refracting filter. Moreover a xenon-illuminated optical fiber seldom achieves practical efficiencies and the use of a laser in public areas frequently requires the user to obtain a license, observe strict safety requirements and undergo safety inspections.

Finally, methods and apparatus that magnify the actual object meant to be simulated have been used generate lumias. While these lumia are usually of higher quality than that generated by a gobo, they are even less amenable to use in a residential setting. For example, the reflected image of water ripples can be reproduced by training a bright spotlight on a reflective pan filled with water and disturbing the surface of the water with an electric fan. Smoke lumias can be reproduced by actually passing light through actual smoke.

Up to now low wattage extended light sources could not be used to generate lumias because the resulting image was too dim to be aesthetically interesting. While a low wattage light source avoids the problem of excessive heat, it simply does not generate enough light with methods of the past.

The need for high-wattage lamps generally precluded the use of lumia in most settings frequented by the public, except the theater. Because the invention is small, uses little power and at a low voltage, it allows the introduction of lumias into almost any setting.

Bornhorst, U.S. Pat. No. 4,800,474 uses overlapping wheels having a plurality of colored filters about the perimeter. This apparatus merely serves to produce various combinations of color and intensity, but does not generate a pattern.

Kosma, U.S. Pat. No. 2,959,094, employs a complicated apparatus requiring overlapping gobo-like cutouts and prisms to generate messages. This device cannot generate a dimensional image though, it uses only opaque cutout filters.

It is therefore an object of this invention to provide an improved and inexpensive method and device to project lumias, made suitable for use in a residential or business setting by use of an extended low wattage light source.

Other objects and advantages of this invention will be both apparent and detailed and are hereinafter set forth.

SUMMARY OF THE INVENTION

The present invention is an apparatus for and method of projecting dimensional images using a low wattage light source. The invention takes advantage of a particular phenomena that occurs when an image-projecting luminaire comprised of three elements, a light source, a variable-refracting filter and an imaging lens are tuned to produce a light intensity efficiency that allows the use of a low wattage light source to generate vivid lumias. Three parameters need to be adjusted to accomplish this, the appropriate size of light source must be used in combination with a variable-refracting filter of correct focal range and an imaging lens of the shortest possible focal length focused near the surface of the variable-refracting filter. Combining these elements at their extreme limits produces a projected image that is both dimensional and bright while using a low wattage light source of extended size.

BRIEF DESCRIPTION OF THE DRAWINGS

FIG. 3 having

DETAILED DESCRIPTION OF THE DRAWING AND PREFERRED EMBODIMENTS

Definitions

Figure 1A:
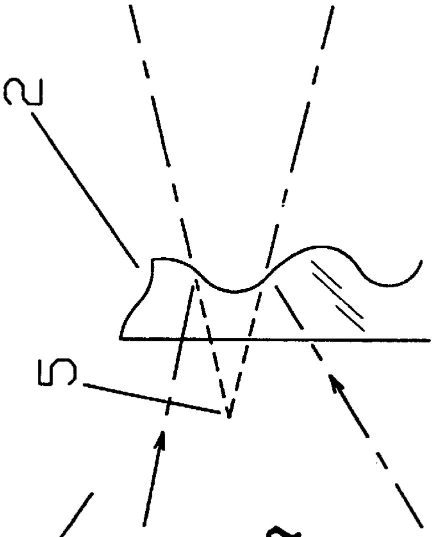
FIG. 1*a* is an enlargement of an area of FIG. 1.

By definition a hypothetical point source of light has no cross-sectional size at all, it is a theoretically perfect point of light. All real light sources have a cross-sectional size. As used here the term extended light source means any light source of 1 millimeter or more in size. A light source is comprised of an emitter which can be enhanced by use of a reflector to focus or direct the emitter. An emitter can be an incandescent light source, such as a bulb containing a glowing filament, an arc light, a fluorescent light or any apparatus that emits light. The inventors anticipate that as the technology develops various types of light sources will become available in the small size that is required of the present invention. A low wattage light source as used here is one having an emitter which uses 100 watts or less to produce light.

The reflector can be of any concave shape, e.g. spherical, parabolic or ellipsoidal, to direct, concentrate or focus the light. Typically the emitter causes a light source of circular or annular shape to be formed by the reflector and the shape of the emitter itself contributes to the shape and size of the light source. A second factor that controls the effective size of the light source is its distance from the variable-refracting filter. For any light source, the greater the distance from the variable-refracting filter, the smaller the effective light source will be.

As used here the term light source size refers to the physical dimension of the light, measured at the light source, and taken at its smallest dimension. In the example above the circular or annular area of light is the light source and would be measured across the outside diameter of the circular or annular shape to obtain the light source size. Were the light source to be rectangular for instance, the light source would be measured along its shortest axis.

As used here the term effective light source size refers to the angular measurement of the light source size, measured from the plane of the variable-refracting filter, along the optical axis. For example, a light source having a light source size of 15 millimeters at a distance of 50 millimeters from the plane of the variable-refracting filter would have an effective light source size of about 19 degrees.

This angular measurement can be calculated by the formula:

$$2(\arctan(S/2)/D)$$

where S is the light source size and D is the distance from the light source to the plane of the variable-refracting filter.

The term narrow effective light source as used herein refers to an effective light source size which falls within the parameters of a tuned system as defined in the graph FIG. 2, below, yet is also extended, having a light source size of 1 millimeter or larger.

The term low wattage narrow effective light source refers to a narrow effective light source using a low wattage light source as defined above.

The terms converging lens and imaging lens as used here refer to essentially the same type of lens but they are used in different manners. Many type of lenses can be used, most commonly the biconvex or plano-convex type of lens.

Lenses have an image side from which the light enters and an object side where the light is projected. Light enters a converging lens from the image side and is focused to a point on the object side, whereas with an imaging lens the light enters from the image side and is magnified on the object side, tracing the path of a converging lens in reverse.

The point at which a converging lens focuses the light, or an imaging lens is focused to receive the light, is the focal point of that lens, more specifically referred to as the object side focal point or the image side focal point, respectively. The distance from the closest surface of a lens to its focal point along the optical axis is the focal length of that lens. The focal plane of a lens is that plane passing through the focal point perpendicular to the optical axis of the lens.

For a variable-refracting filter, a multiple-lensing material having many individual focal points each with their own focal length, the zone wherein substantially all of the focal lengths lay is referred to herein as the focal range. For example, a variable-refracting filter having a 5 millimeter focal range would have a majority of all of the focal points within a zone bounding 5 millimeters on one or both sides of the variable-refracting filter.

Some areas of the variable-refracting filter exhibit the properties of converging lenses, created by the bumps or peaks in the surface of the variable-refracting filter. Other areas exhibit the properties of diverging lenses created by the valleys in the variable-refracting filter. A diverging lens does not create an image side focal point, it diverges light to create an image which appears at the object side focal point, called a negative image.

Discussion

The contour of the individual peaks and valleys of the variable refracting filter is what gives rise to the refractive or lensing quality of the material. The more convex in shape a bump, the greater the converging power and correspondingly shorter the image side focal length. By way of example, if an ideal spherical, convex lens was to become flatter and then continuously transformed into a concave lens the image side focal length would become longer as the lens flattened, losing any refraction upon reaching flatness, whereupon the focal point of that lens would reverse to the object side and become shorter as the lens became more concave.

Figure 1:
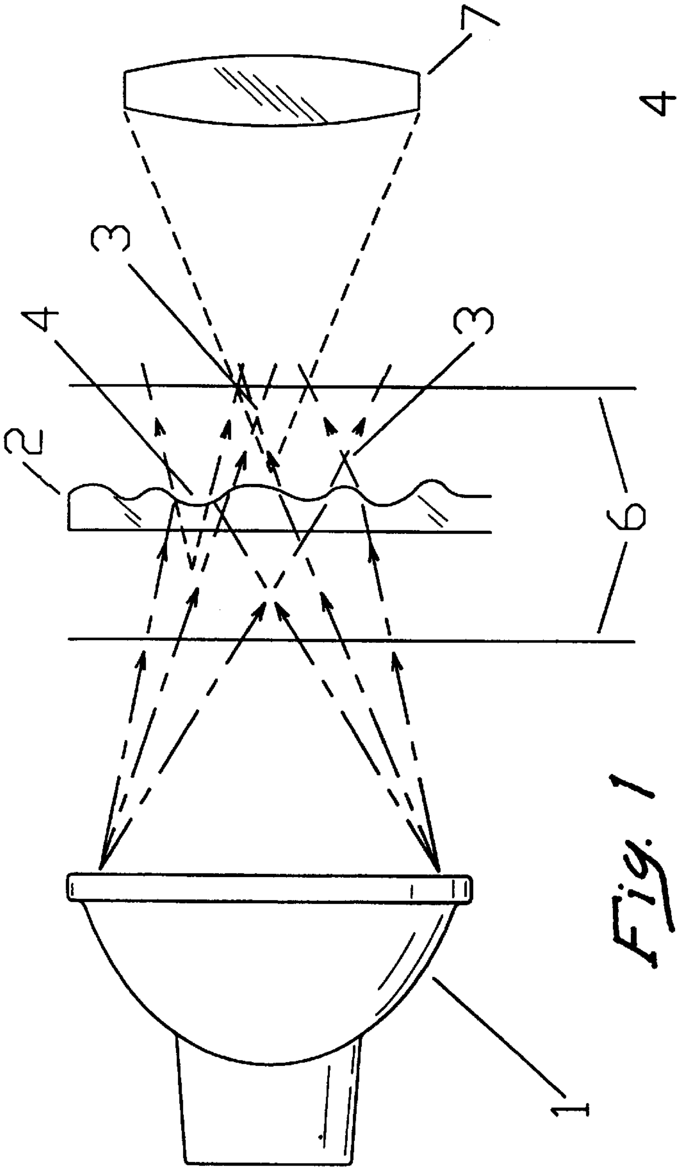
FIG. 1 is a schematic view of the relationships of the parts of the invention.

Referring now to FIG. 1, the rays of light emitted from light source 1 are traced to variable-refracting filter 2. Those rays of light that are lensed by bumps in the variable-refracting filter are concentrated to a point, shown at 3, due to the bumps acting as converging lenses. Where light from the light source reaches a valley in the variable-refracting filter, the variable-refracting filter acts as a diverging lens shown at 4, causing the light rays to diverge. This example area of divergence 4 is enlarged in FIG. 1*a* as 4. This divergence causes a negative image 5 to be formed on the side of the variable-refracting filter proximal to the light source.

Referring again to FIG. 1 the focal lengths of the lenses in the variable-refracting filter vary depending on the size and type of material used to make the variable-refracting filter and the zone where most of the focal points bounding either side of the variable-refracting filter fall is herein denoted the variable-refracting filter focal range, or, abbreviated as VRF focal range 6.

The imaging lens 7 is focused within the VRF focal range to project an image. Here and there the focal points of the imaging lens and the variable-refracting filter will come close to each other or meet, projecting an image of the light source which is pronouncedly greater in light intensity.

It should be noted that while past methods and apparatus of projecting lumias require that the object to be imaged be uniformly illuminated with no image of the light source apparent, the present invention requires the opposite, that the light source itself be imaged by the variable-refracting filter.

There are two factors that set the outside parameters of the invention: one is the effective light source size, the second is the construction of the variable-refracting filter.

With a variable-refracting filter of a given VRF focal range, as the effective light source size increases, images of that light source which are produced by the variable-refracting filter within its VRF focal range increase in size as well. Because the imaging lens magnifies and projects the images found within the VRF focal range, the projected images of the light source increase in size proportionately. The effective light source size becomes too large when the images produced within the VRF focal range by adjacent lens areas of the variable-refracting filter become so large that they overlap, this destroys the resolution and contrast of the projected image of the light source produced by the imaging lens.

For a variable-refracting filter of a given VRF focal range, as the effective light source size decreases, the images of that light source which are produced by the variable-refracting filter within its VRF focal range, decrease in size as well. Because the imaging lens magnifies and projects the images found within the VRF focal range, the projected images of the light source decrease in size proportionately. As the light source size approaches one millimeter, images produced in the VRF focal range by adjacent lens areas are small relative to the spacing between them and the projected image becomes very sharp and webby in appearance.

It follows that changes in the VRF focal range size will compensate for variations in effective light source size, but only over a limited range. Compensating for an increase in effective light source size requires a corresponding decrease in VRF focal range size. Compensating for a decrease in effective light source size requires a corresponding increase in VRF focal range.

It also follows that the size of the images of a light source of a given effective size, produced within the VRF focal range, vary with the size of the VRF focal range; the smaller the variable refracting filter VRF focal range, the smaller the images of the light source in the VRF focal range. Similarly, the larger the VRF focal range, the larger the images of the light source in the VRF focal range will be.

There is no limit to how long the focal length of a lens, here the variable-refracting filter, can become; as the contour approaches flatness, the focal length becomes infinite. In this invention as the VRF focal range increases, either the imaging lens focal length must shorten or the imaging lens must be moved increasingly distant from the variable-refracting filter to maintain image quality.

There is a practical limit however to how short the VRF focal range can become because there is a practical limit to the contour of the variable-refracting filter surface. This is because there is a limit to how short a focal length a lens of any given diameter can achieve. Few practical lenses achieve focal lengths much shorter than their diameter. Shorter image side focal point lengths are produced by increasingly convex curvature, and shorter object side focal lengths are produced by increasingly concave curvatures. Eventually the contours approach vertical peaks or valleys and these impossibly convoluted shapes cannot physically be produced. The practical limits of a variable-refracting filter are similarly approached as the adjacent lens areas require impossibly steep profiles.

The imaging lens should be of the shortest focal length possible, the inventors feel that the best mode of practicing the invention is in using an imaging lens of f1 or less. The longer the focal length of the imaging lens, the less light is gathered and this reduces the optical efficiency of the invention.

Figure 2:
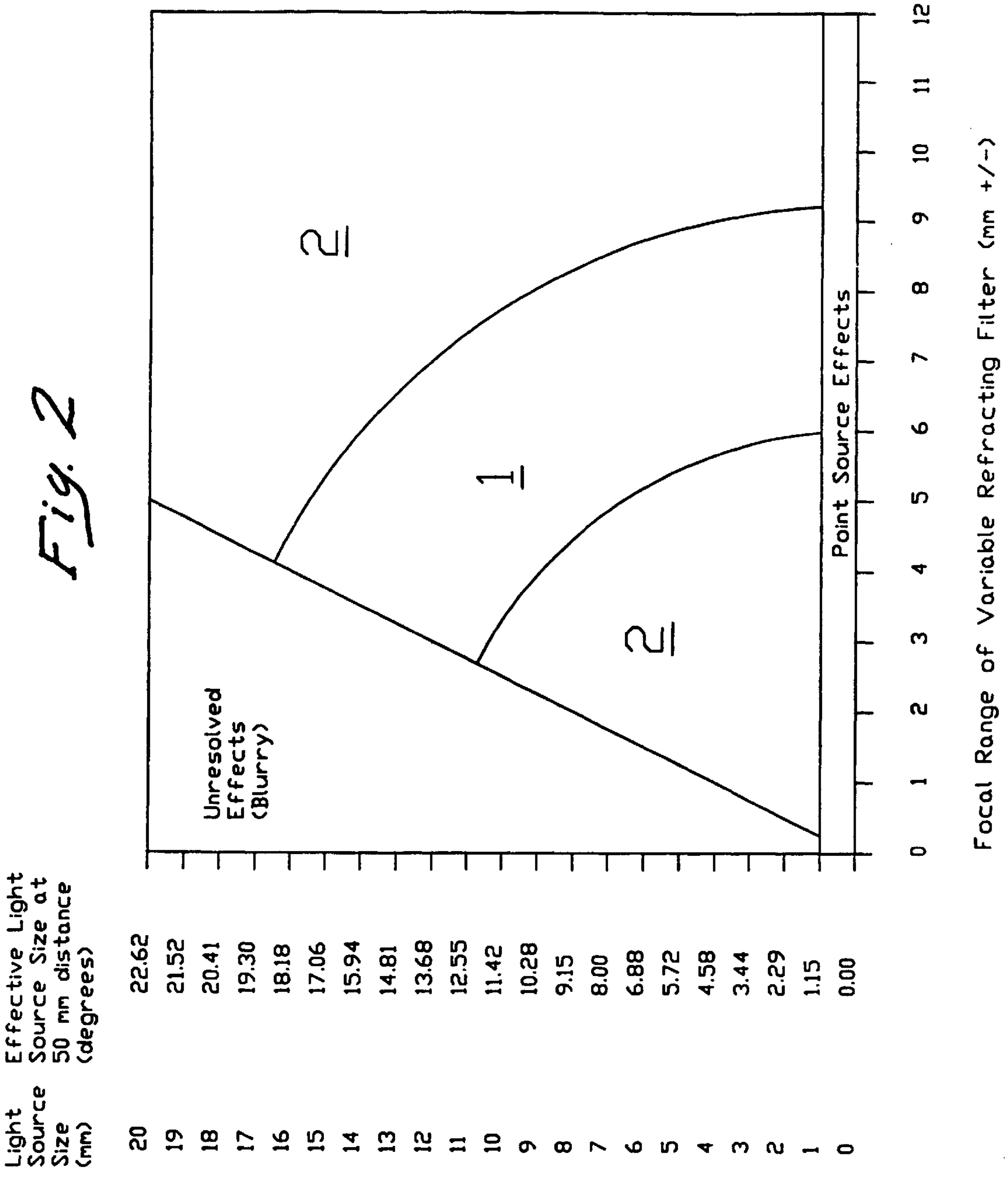
FIG. 2 is a graph showing the limits of the required parameters used in the invention.

The inventors have determined that when the parameters shown in FIG. 2 are observed with the light source and the variable-refracting filter, and additionally when they are also used with an imaging lens having its object side focal point in the VRF focal range, the three components are tuned or in tune to produce the lumia. Referring again to FIG. 2, the effective light source size at a 50 millimeter distance is plotted along the Y axis and correlated to the size of the VRF focal range on the X axis. The numbers for the VRF focal range denote the distance on one side of the variable-refracting filter. The correct parameters to tune the invention are described in the graph as areas 1 and 2, while the area that produces the effect most intensely is described in the graph as area 1.

Figure 3A:
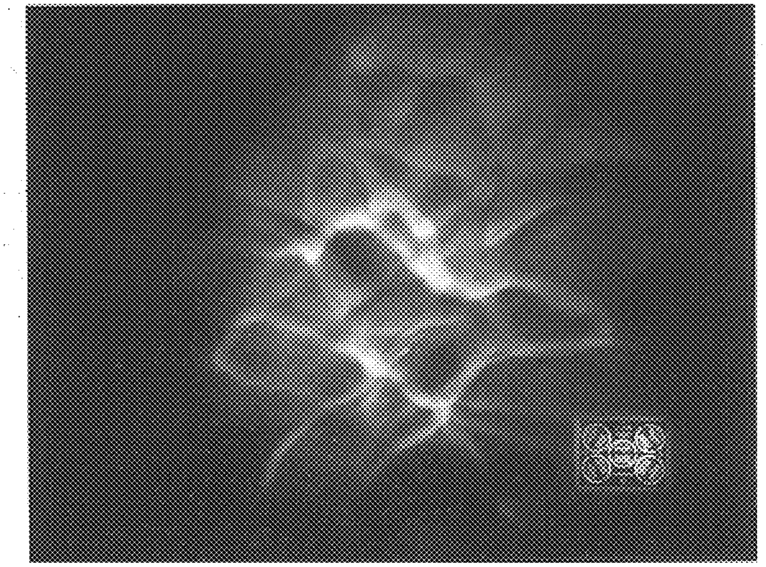
FIGS. 3*a*, 3*b* and 3*c* are photographic exemplars of lumia showing the lumia effect over the range of parameters delineated in the graph of FIG. 2.
Figure 3B:
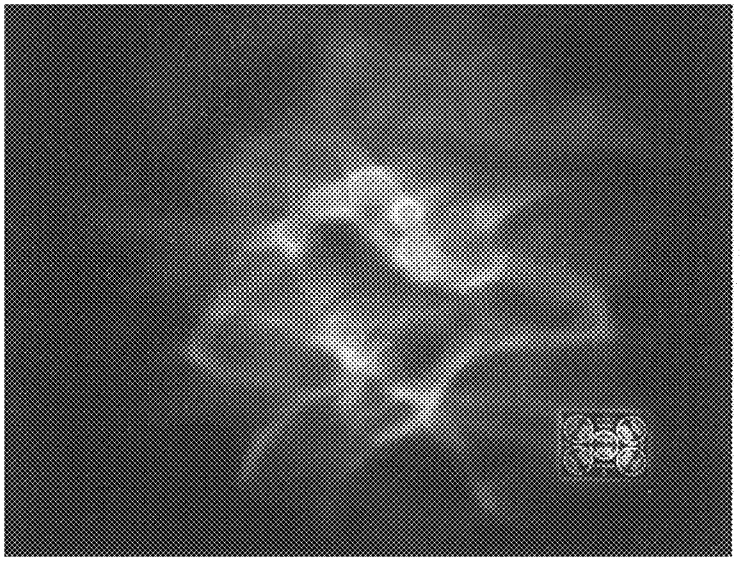
Figure 3C:
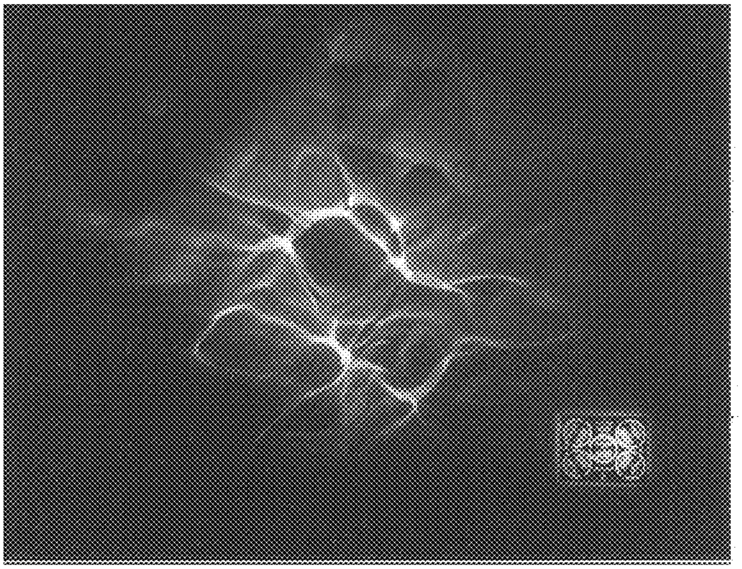

The lumia effect generated by the apparatus and method of the present invention is shown in the photographs of FIGS. 3*a*, 3*b* and 3*c*. FIG. 3*a* shows a lumia produced by a tuned lumia projector, in this case the preferred embodiment, below. The lumia has well-resolved lines corresponding to those of the variable-refracting filter. FIG. 3*b* shows a lumia from a non-tuned lumia projector, the effective light source size being too large. The lumia has little resolution and there is relatively little contrast across the lumia. FIG. 3*c* shows the lumia from a lumia projector using an extended light source size of 1.5 millimeters; the image is shown becoming very sharp.

These photographs of FIGS. 3*a*, 3*b* and 3*c* also show a resolution chart for reference which is not related to the lumia or the invention, but merely to verify the focus of the camera used to take the photographs.

In the preferred embodiment of the invention a light source size of approximately 12 millimeters at a distance of about 50 millimeters from the plane of the variable-refracting filter is used, having an effective light source size of about 14 degrees. The variable-refracting filter used has a VRF focal range of approximately 3 millimeters.

Preferred Embodiment

The preferred embodiment of the present invention employs a narrow effective light source of approximately 12 millimeters in size having a parabolic reflector and further having a low wattage incandescent bulb as the emitter. The preferred embodiment employs a 12 volt, 20 watt incandescent lamp.

While the inventors prefer the use of an incandescent lamp having a glowing filament within a bulb, it should be noted that they contemplate that as the technology progresses other inexpensive, low heat and adequately narrow effective light sources may become available, such as a fluorescent or arc lamp, which could be used for this application as well.

In the preferred embodiment a General Electric model Q20MR11/NSP (ANSI FTB) lamp is employed, having a beam spread of approximately 10 degrees. Alternatively a Ushio (ANSI FTE) 12 volt, 35 watt lamp can be used.

The light generated from this light source is then passed through a first variable-refracting filter, then a second variable-refracting filter. Stippled or rippled translucent plastic or glass can be used as the variable-refracting filter in this embodiment. The imaging lens is focused within the combined VRF focal range of these two variable-refracting filters, in the preferred embodiment the object side focal point of the imaging lens is focused just equidistant between the two variable-refracting filters. In the preferred embodiment each of the variable-refraction filters is a disk centrally mounted on the drive shaft of an electric motor is and rotated during operation.

The two variable-refracting filters in the preferred embodiment are circular disks centrally mounted on the drive shafts of small electric motors and are rotated to produce movement in the resulting lumia.

The inventors have found that the glass sheet patterns having stippled or rippled patterns work well, such as the type commonly used in shower enclosures, but acrylic plastic can be used as well.

Figure 4:
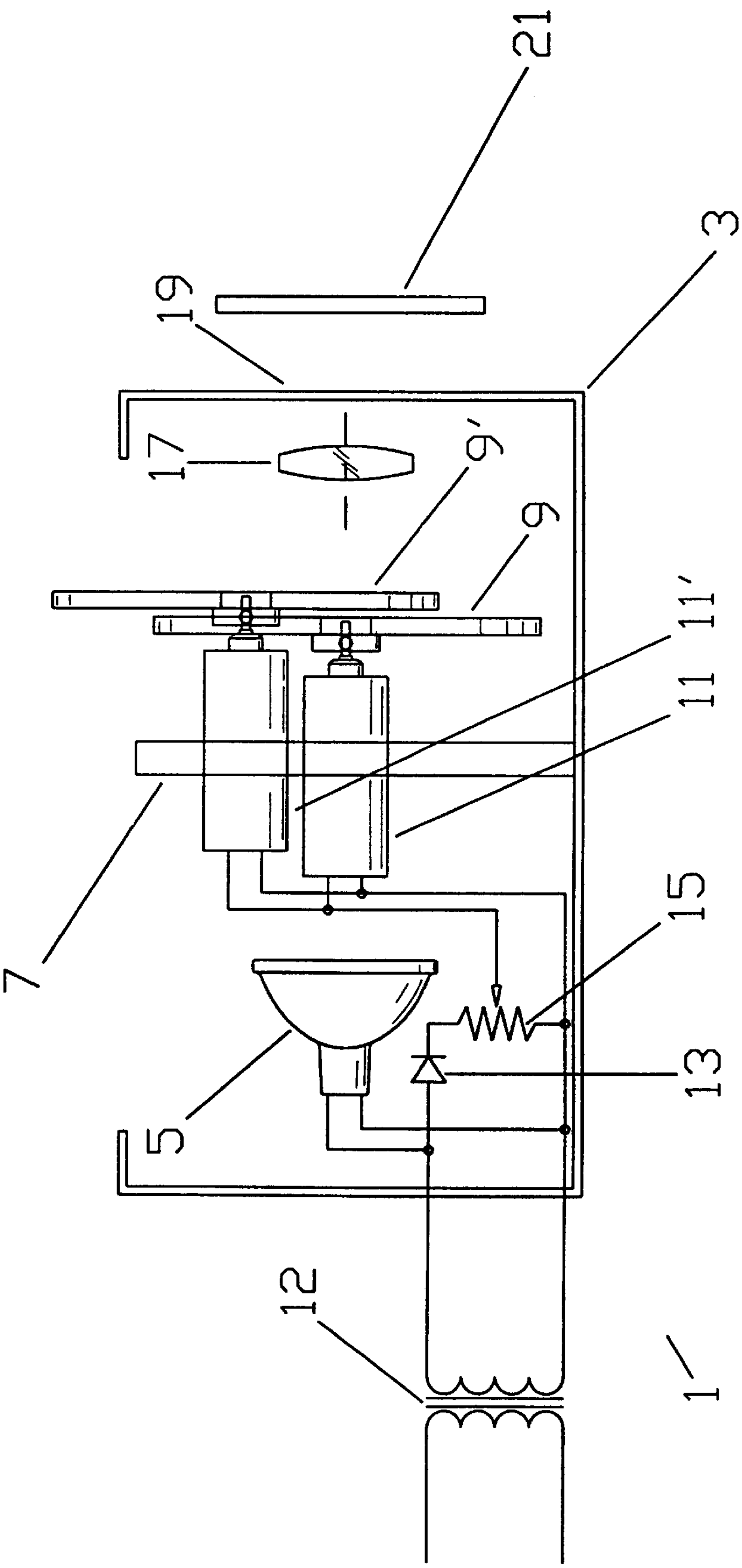
FIG. 4 is a side elevation schematic view of the apparatus of the present invention showing the relative placement of the component parts.

Referring now to FIG. 4 the invention 1 is depicted from a side elevation view, comprised of a housing 3, an enclosed box having a 20 watt, 12 volt incandescent light source 5. A support bracket 7 having an aperture supports the motors 11 and 11' and while only structural to support the motors allows the light to pass through to overlapping variable-refracting filter wheels 9 and 9'. Incandescent light source 5 is positioned about 50 millimeters from the nearest variable-lens refracting filter 9. Variable-refracting filter wheel 9 is mounted centrally on the drive shaft of motor 11, while variable-refracting filter wheel 9' is mounted centrally on the drive shaft of motor 11'. The incandescent lamp 5 and the motors are both powered by transformer 12 which transforms 120 volt AC wall electricity into 12 volts AC to power the lamp. Rectifier 13 provides DC current to power the motors using electrical circuitry well known in the art. A rheostat 15 regulates the amount of current to motors 11 and 11' and therefore the speed of rotation. The inventors have determined that an image is best generated with a motor speed of 5 RPM or less.

The light generated by the incandescent light source passes through the overlapping variable-refracting filter wheels and thereafter magnified by a imaging lens 17 which is slidably mounted (not shown) to allow adjustment of distance of the imaging lens from the variable-refracting filter. The light can then optionally be passed through a color filter 21 to project the desired image on a ceiling, wall, etc.

The configurations of the transformer, rectifier, rheostats and slidable imaging lens and use of a color filter are common and well-known to those of ordinary skill in the art.

Figure 5:
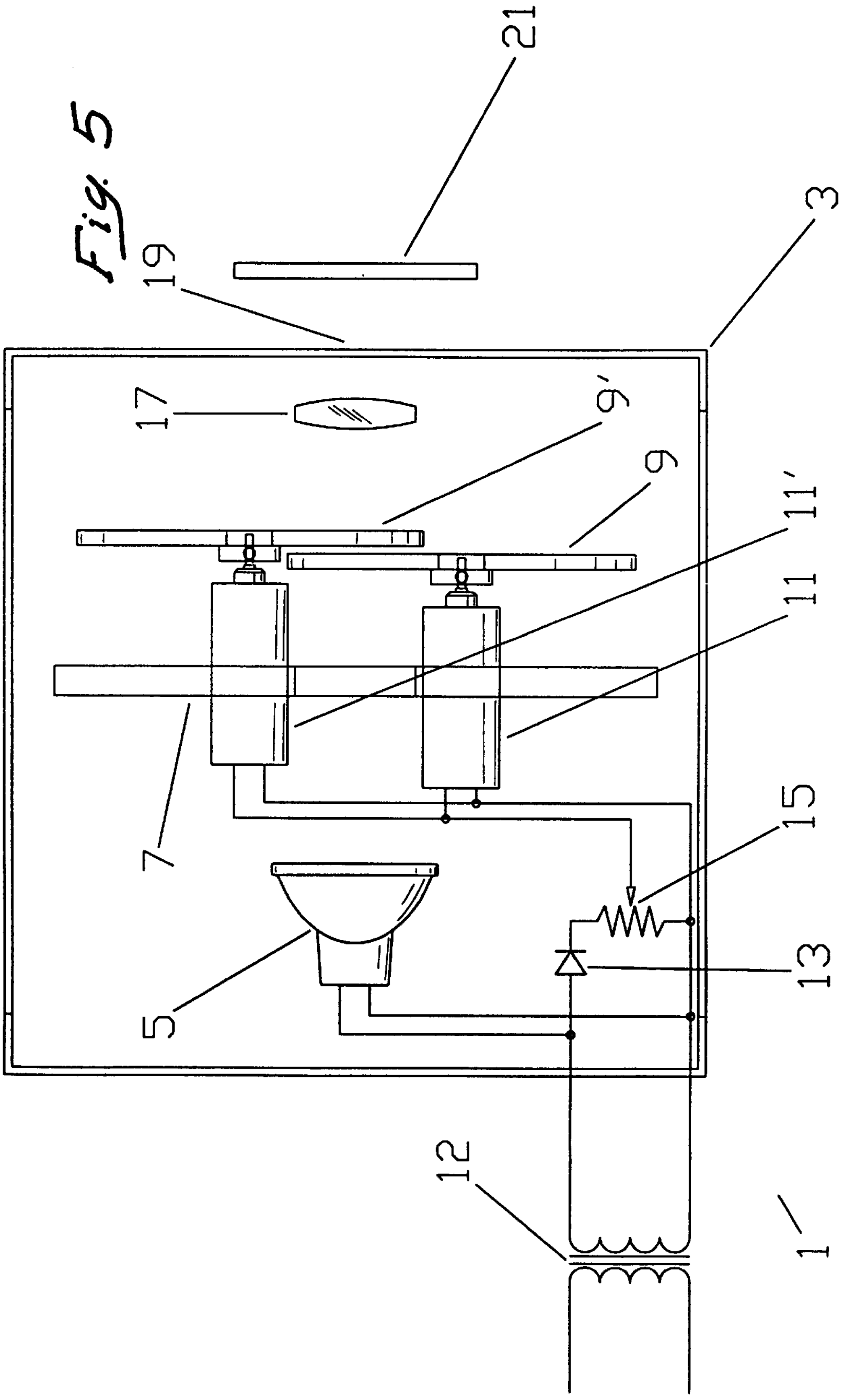
FIG. 5 is a top plan schematic view of the apparatus of the present invention showing the relative placement of the component parts.

Referring now to FIG. 5 the invention 1 is depicted schematically from a top plan view. The invention is comprised of a housing 3, an enclosed box, having a 20 watt, 12 volt incandescent light source 5. A support bracket 7 having an aperture supports the motors 11 and 11' and is merely structural yet allows the light to pass through to overlapping variable-refracting filter wheels 9 and 9'. Incandescent light source 5 is positioned about 50 millimeters from the nearest variable-lens refracting filter 9. Variable-refracting filter wheel 9 is mounted centrally on the drive shaft of motor 11, while variable-refracting filter wheel 9' is mounted centrally on the drive shaft of motor 11'. The incandescent lamp 5 and the motors are both powered by transformer 12 which transforms 120 volt AC wall electricity into 12 volts AC to power the lamp. Rectifier 13 provides DC current to power the motors using electrical circuitry well known in the art. A rheostat 15 regulates the amount of current to motors 11 and 11' and therefore the speed of rotation. The inventors have determined that an image is best generated with a motor speed of 5 RPM or less.

The light generated by the incandescent light source passes through the overlapping variable-refracting filter wheels and thereafter magnified by a imaging lens 17 which is slidably mounted (not shown) to allow adjustment of distance of the imaging lens from the variable-refracting filter. The light can then optionally be passed through a color filter 21 to project the desired image on a ceiling, wall, etc.

Variable-refracting filter wheels 9 and 9' in FIGS. 4 and 5, are made from a textured pattern, usually a transparent plastic, having an irregular surface. The wheels are about three inches in diameter but this is not critical, they should be placed as close together as possible. The variable-refracting filter wheels are best made from glass or plastic having a varying surface and an VRF focal range of about 3 millimeters from the surface of the variable-refracting filter wheels.

Use of the two wheels gives an added dimensional effect to the projected image. Certain desired effects determine in which direction the variable-refracting filter wheels should rotate. For instance, for the effect of a water pattern it is best to have the wheels turn in the same direction; in this way the projected image shows features moving both up and down simultaneously as the light travels through the overlap of both variable-refracting filter wheels. For the effect of fire, both variable-refracting filter wheels should be turning in opposite directions. This can project an image whose motion corresponds to the image of upwardly licking flames.

The object side focal point of imaging lens 17 is positioned to a point between and about equidistant from the surface of the two variable-refracting filter wheels.

In the best mode a color filter is placed on the image side of the imaging lens so the light passes through it to create a colored lumia to be projected image on a wall or screen. The inventors believe that a gel filter is best used for this purpose because they are economical and come in a wide range of colors. A colored or tinted material can also be used as the variable-refracting filter material to impart color to the projected image.

As shown in FIGS. 4 and 5, after the light from light source 5 passes through variable-refracting filter wheels 9 and 9' it is magnified and focused by imaging lens 17. The inventors have found that a double-convex lens that has a relatively short focal length of about 25 millimeters (about f1) works best.

The above description of the embodiments of the apparatus and method claimed herein should not be construed as limiting and additional applications of this apparatus and method will be plain to one of ordinary skill in the art.

What is claimed is:

1. A luminaire for generating lumias, comprising:

a) a low wattage narrow effective light source, b) said low wattage narrow effective light source projecting light onto a variable-refracting filter, and c) an imaging lens, wherein said low wattage light source, said variable-lens refracting filter and said imaging lens are in tune.

2. The luminaire of claim 1, wherein said low wattage light source is less than 50 watts.

3. The luminaire of claim 1, wherein said variable-refracting filter is made of plastic.

4. The luminaire of claim 1, wherein said variable-refracting filter is made of glass.

5. The luminaire of claim 1, wherein said imaging lens projects an image onto a color filter thereby coloring the projected light.

6. The luminaire of claim 1, wherein the low wattage narrow effective light source is between 10 and 15 millimeters in dimension, said variable-refracting filter is made of plastic and positioned at a distance between 45 and 55 millimeters from said low wattage effective light source and further where the wattage of said low wattage narrow effective light source is between 15 and 25 watts.

7. A method for generating lumias, comprising the steps of:

a) causing a low wattage narrow effective light source to project light onto a tuned variable-refracting filter, b) positioning an imaging lens such that the object side focal point of said imaging lens falls within the VRF focal range and projects lumia images.

8. The method of claim 7, wherein said low wattage light source is less than 50 watts.

9. The method of claim 7, wherein said variable-refracting filter is made of plastic.

10. The method of claim 7, wherein said variable-refracting filter is made of glass.

11. The method of claim 7, having the additional step of placing a color filter in front of said imaging lens to project colored lumia.

12. The method of claim 7, wherein the light source size of the low wattage narrow effective light source is between 10 and 15 millimeters, the variable-refracting filter is made of plastic and positioned at a distance between 45 and 55 millimeters from said low wattage narrow effective light source and further where the wattage of said low wattage narrow effective light source is between 15 and 25 wafts.

* * * * *